Patented Oct. 10, 1950

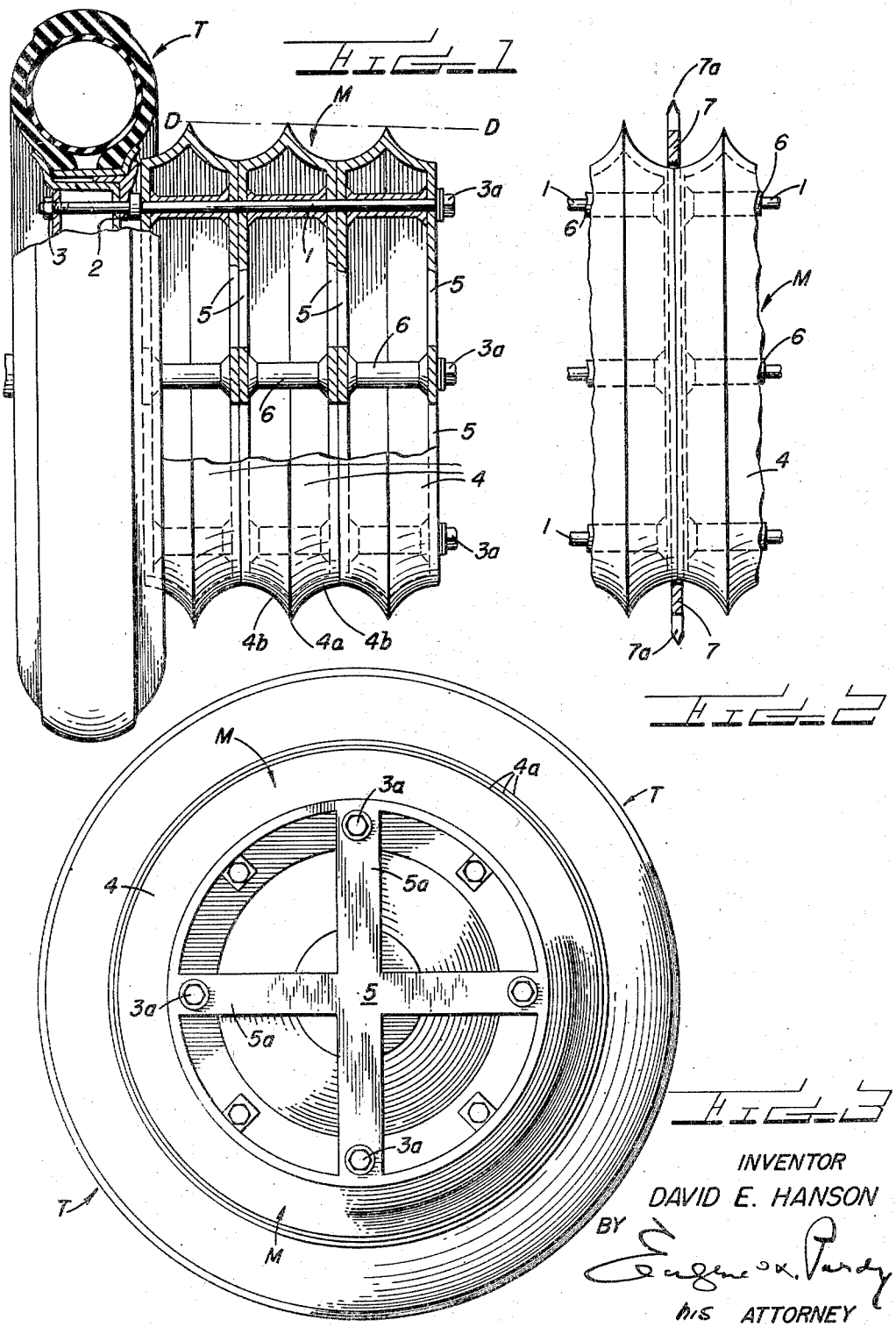

2,525,545

UNITED STATES PATENT OFFICE 2,525,545

TRACTOR WHEEL SUPPORTED MULCHING ROLLER

David E. Hanson, Marne, Mich.

Application May 27, 1946, Serial No. 672,406

2 Claims. (Cl. 97—6)

This invention relates to soil working devices and has for its object to provide a mulching roller adapted to be attached to the wheel of a tractor or plow for acting upon the soil turned up by the plow and lying adjacent the furrow in order to enable the soil to more readily retain its moisture.

An important object of my invention is to provide a mulching roller adapted to be attached to the side face of a wheel of a tractor or plow in coaxial relation therewith so that as the wheel travels within a plowed furrow, the roller will ride over the mound of earth extending alongside the furrow and break up the clods and compact the soil.

Another object of the invention is to provide a mulching roller of the above character having a series of circumferential, laterally-spaced ridges with relatively shallow valleys therebetween. In a preferred form of the invention, the diameter of the roll decreases in a direction outwardly of the wheel face so as to compensate for tilting of the tractor when the wheels on one side only of the tractor travel within a furrow.

A further object of my invention is to provide a mulching roller of the above character having peripherally sharpened toothed disks located intermediate the ridges.

Still another object of my invention is to provide a mulching roller of the above character comprising a series of rings or breaker units held in juxtaposed, coaxially assembled relation and so constructed and arranged that the length of the roller may be varied by adding or subtracting units as occasion demands.

Another object of my invention is to provide a mulching roller of the above character which is simple and strong in construction, easy to mount and which lends itself to economical manufacture.

Another object of my invention is to provide a mulching roller of the above character which serves to pack or mulch the soil at or closely following the time that it is newly turned by the plow and which is the most desirable time for conducting this operation.

Other objects and advantages will be apparent from the following detailed description of a preferred embodiment of the invention, reference being had to the annexed drawing in which:

Figure 1 is a side view, in part cross-sectional, of a mulching roller attached to the wheel of a tractor;

Figure 2 is an end view of the mulching roller shown in Fig. 1; and

Figure 3 is a fragmentary side view of a slightly modified form of mulching roller.

Referring to Figs. 1 and 2 of the drawing, there is shown a pneumatic-tired wheel T of a tractor upon which is detachably mounted a mulching roller M.

The mulching roller comprises a plurality of tie rods 1 (in the present instance shown as four) extending horizontally outward from the wheel and having their inner threaded ends passing through openings in the rim-supporting structure of the wheel. Shouldered portions 2 are provided upon the rods adjacent their inner ends which abut a side face of the wheel, while nuts 3 screwed upon the same end of the rods are adapted to be tightened into engagement with the opposite face of the wheel to clamp the rods thereto. Assembled upon the rods 1 is a series of compacting units in the form of rings 4, the circumferential tread face of each ring presenting a central ridge 4a defined by the meeting edges of two adjacent slightly dished surfaces 4b. On opposite sides of each ring are a plurality (in the present instance, four) of radially disposed webs 5 constituting reinforcing members extending between the outer edges of the surfaces 4b.

The webs 5 are provided with holes for passing the tie bolts 1 upon which the rings are supported and between the pair of webs of each ring and in line with these holes are sleeves 6. These sleeves are welded at their ends to the webs so as to rigidify the ring structure.

Preferably the roller will be attached to the rear right wheel of the tractor, although this is largely a matter of choice. Since the wheels of the tractor which travel along the furrow are at a lower elevation than the wheels on its opposite side, a sidewise tilt will be imparted to the tractor. In order that the tread surface of the roller may extend generally parallel with the ground level, the rings 4 are assembled on the rods 1 so that they decrease in diameter in a direction from the tractor wheel T outwardly thereof. This change in diameter is shown by the dotted line D—D in Fig. 1.

In practice, as the tractor travels along with its wheel T in the furrow, the roller will travel over the mound of earth skirting the furrow and break up the clods and compact the earth by the action of the sharp ridges 4a and concave surfaces 4b on the earth. The width of the rings 4 is optional but preferably will be about seven inches so that for a furrow of from 12 to 18 inches in width a roller comprising three rings will operate satisfactorily. When plowing two or more furrows, additional rings or units may be added to the roller, by substituting longer rods 1, so that all the soil turned over on a preceding plowing operation will be packed and mulched.

While the webs 5 may be cast integral with the rings, it may be found more advantageous to construct these webs of radial cross pieces welded together at their centers and welded to the edges of the rings at their outer ends.

In Fig. 3 is shown a slightly modified form of mulching roller. This form of the roller corresponds in all substantial respects to the roller previously described with the exception that disks 7 are freely mounted upon the roller in the space between adjacent ridges 4a thereof. These disks (which may take other suitable forms) are of somewhat larger diameter than the rings so as to be independently rotatable thereon. The periphery of each disk is fashioned in the form of teeth 7a which are sharpened to improve their cutting action. The function of these disks is to break and cut up sticks, roots, and clods of material which might be too tough for disintegration by the rings 4.

It will be apparent to those skilled in the art that the invention may take other forms than that described above, which is to be considered only as exemplary of a preferred embodiment thereof, without departing from the spirit of my invention as defined by the following claims.

I claim:

1. A mulching roller for attachment to the wheel of a tractor, said roller comprising a plurality of independent rings assembled side-by-side with the circumferences of the rings together presenting a compacting and mulching surface having sharpened circumferential ridges and intervening valleys, reinforcing members extending in laterally-spaced relation between the circumference of each ring, each of said reinforcing members comprising a plurality of intersecting, diametrically-disposed webs, transversely-aligned openings in the plurality of webs, sleeves extending between adjacent webs of each ring in line with the openings and tie-bars adapted to be connected at one end to the wheel of a tractor extending through the aligned openings and sleeves.

2. A mulching roller as set forth in claim 1 in which the rings are of substantially less diameter than the tractor wheel and of uniformly different diameter from each other with a ring of larger diameter lying adjacent a ring of smaller diameter and with the ring of smallest diameter located farthest from the tractor wheel, whereby said rings together present a tapered circumferential surface to said mulching roller.

DAVID E. HANSON.

REFERENCES CITED

The following references are of record in the file of this patent:

UNITED STATES PATENTS

| Number | Name | Date |
|---|---|---|
| 297,084 | Munz et al. | Apr. 15, 1884 |
| 1,467,056 | Mix | Sept. 4, 1923 |
| 1,707,384 | Bixel | Apr. 2, 1929 |
| 1,798,393 | Anderson | Mar. 31, 1931 |